United States Patent [19]

Mulkens et al.

[11] Patent Number: 5,287,207
[45] Date of Patent: Feb. 15, 1994

[54] DOUBLE TN CELL LCD DISPLAY WITH DIFFERENT GOOCH & TARRY EXTREMES

[75] Inventors: Johannes C. H. Mulkens; Ingrid E. J. R. Heynderickx, both of Eindhoven, Netherlands

[73] Assignee: U.S. Philips Corporation, New York, N.Y.

[21] Appl. No.: 939,279

[22] Filed: Sep. 2, 1992

[30] Foreign Application Priority Data

Sep. 17, 1991 [EP] European Pat. Off. ........ 91202383.5

[51] Int. Cl.$^5$ .................... G02F 1/133; G02F 1/1335; G02F 1/13
[52] U.S. Cl. .......................................... 359/73; 359/53; 359/102
[58] Field of Search .............................. 359/53, 73, 93

[56] References Cited

U.S. PATENT DOCUMENTS

| | | | |
|---|---|---|---|
| 4,408,839 | 10/1983 | Wiener-Avnear | 359/73 |
| 4,443,065 | 4/1984 | Funada et al. | 359/53 |
| 4,936,654 | 6/1990 | Suzuki et al. | 359/93 |
| 5,091,794 | 2/1992 | Suzuki | 359/93 |
| 5,107,356 | 4/1992 | Castleberry | 359/93 |
| 5,119,216 | 6/1992 | Wada et al. | 359/53 |
| 5,142,393 | 8/1992 | Okumura et al. | 359/73 |
| 5,150,237 | 9/1992 | Iimura et al. | 359/73 |
| 5,157,523 | 10/1992 | Yamagishi | 359/41 |

OTHER PUBLICATIONS

Gooch & Tarry J. Phys. D: Appl. Phys. vol. 8, 1975, 1575-84.
E. P. Raynes, Mol. Cryst. Liq. Cryst. Lett. 4, 69 (1987).

Primary Examiner—William L. Sikes
Assistant Examiner—Kenneth Parker
Attorney, Agent, or Firm—John C. Fox

[57] ABSTRACT

In a double cell the values of d.Δn for both the actual cell (10) and the compensation cell (20) having opposite twist angles φ are chosen to be such that they are associated with different Gooch & Tarry extrema for a given wavelength. The compensation cell may then be thicker and can be obtained in a simpler manner. A universal compensation cell may alternatively be used.

27 Claims, 2 Drawing Sheets

DOUBLE TN CELL LCD DISPLAY WITH DIFFERENT GOOCH & TARRY EXTREMES

BACKGROUND OF THE INVENTION

The invention relates to a liquid crystal display device having a first liquid crystal cell between two polarizers and comprising a twisted nematic layer of liquid crystalline material having a twist angle $\phi_1$ and a thickness $d_1$, while the optical path length difference is $d_1.\Delta n_1$ for incident light having a central wavelength $\lambda_0$, said display device further comprising a compensating layer of optically anisotropic material having a twist angle $\phi_2$ in the opposite direction.

Display devices of this type are used, for example in projection television. The difference $\Delta n$ is the difference in refractive index for the ordinary and the extraordinary wave (anisotropy or birefringence).

A display device of the type described above is known from U.S. Pat. No. 4,443,065. With the aid of such a device, interference effect in a twisted nematic liquid crystal display device are eliminated as much as possible by means of a second twisted nematic liquid crystal cell which has preferably the same twist angle and the same optical path length difference. Notably the last-mentioned condition often imposes stringent requirements on the manufacturing process because a small tolerance in the thicknesses of the two composite cells is permitted when using one and the same liquid in the two cells (the same $\Delta n$).

The interference effects occur to an even stronger extent in liquid crystal display devices having a large twist angle $\phi$. For these devices similar solutions have been given for double cells with $\phi_1 \neq \phi_2$ in which an optimum relation is given between the twist angles and the associated values of $d.\Delta n$. However, since these are passively driven display devices, this optimization focuses on drive properties (particularly a steep transmission/voltage characteristic curve) with which no high contrasts are achieved (they remain limited to about 10:1).

OBJECTS AND SUMMARY OF THE INVENTION

It is, an object of the invention to provide a display device of the type described in the opening paragraph which is suitable for projection television in that a high contrast can be achieved.

It is another object of the invention to provide such a device which imposes minor requirements on manufacture as regards thickness tolerances of the compensating layer.

Finally, it is an object of the invention to provide a display device having different twist angles $\phi_1$ for which one type of compensation cell is satisfactory.

To this end a display device according to the invention is characterized in that the twist angle $\phi_1$ is between 65° and 115° and the value of $d_1.\Delta n_1/\lambda_0$ for the first liquid crystal cell is determined by a Gooch & Tarry extremum, while the twist angle $\phi_2$ is between $-115°$ and $-65°$ for the compensating layer and the value of $d_2.\Delta n_2/\lambda_0$ is determined by a Gooch & Tarry extremum of a different order than that of the first cell.

In this connection Gooch & Tarry extremum is understood to mean a minimum value (in the case of parallel polarizers) or a maximum value (in the case of mutually perpendicular polarizers) of the transmission (T) as has been derived for a twisted nematic cell having a twist angle of 90° by Gooch & Tarry in J. Phys., D8, 1575 (1975). More generally, the relevant function is derived as a function of the states of polarization, the twist angle and $d.\Delta n$ by E. P. Raynes in Mol. Cryst. Liq. Cryst. Lett. 4, 69 (1987).

It is found that with this choice of the thickness and the birefringence for each cell, such values can be chosen that an optimum contrast is achieved, notably if the director halfway through the liquid crystal cell extends at a substantially right angle to the director halfway through the compensating layer in the voltageless state.

The angle between the polarization directions of the two polarizers is preferably 90°. It is thereby achieved that any defective pixels are visible as dark dots due to open connections, which is less disturbing than when they are visible as light dots (as is the case with a single cell between crossed polarizers).

Since the value $d.\Delta n$ associated with an extremum of a higher order may be much larger when using the same liquid (hence the same $\Delta n$), a larger thickness can be chosen at a $\Delta n$ value remaining equal so that much less stringent requirements are imposed on the manufacture of the compensating layer (thickness variation, manufacturing circumstances). On the other hand a universal compensator can be used, for example, a 90° twistor having such a thickness that it is in a second or third Gooch & Tarry extremum.

BRIEF DESCRIPTION OF THE DRAWINGS

These and other aspects of the invention will now be described in greater detail with reference to some embodiments and the drawing in which.

DESCRIPTION OF THE PREFERRED EMBODIMENTS

Figure 1:
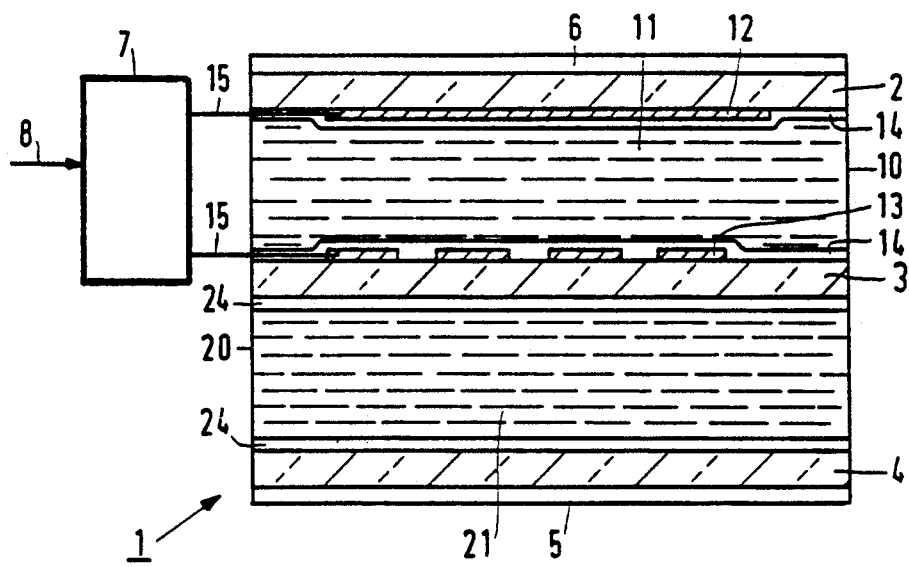
FIG. 1 shows, in a diagrammatical cross-section, a device according to the invention, FIG. 2(a) (b) and (c) show diagrammatically the transmission T as a function of the $d.\Delta n$ value of the compensating layer for different twist angles $\phi$ and $d.\Delta n$ of the first cell.

The display device 1 of FIG. 1 comprises a first display cell 10 with a layer 11 of liquid crystalline material having a positive dielectric anisotropy between two transparent supporting plates 2, 3. On the side of the supporting plates 2, 3, are provided electrodes 12, 13 defining, for example, a matrix of pixels. The pixels may be driven with selection signals and data signals via switching elements and drive electrodes (active drive); alternatively, the pixels may be defined by overlapping portions of track-shaped electrodes and may then be directly driven with selection signals and data signals (passive drive). These drive voltages are obtained, for example, by means of a drive circuit 7 which converts incoming information 8 (TV signals, information about data-graphic symbols, etc.) into said drive voltages, which are then applied to the electrodes 12, 13 via connection lines 15. Layers 14 of an insulating material, used, in this example, also as orienting layers for the liquid crystalline material layer 11 are present on the layers 12, 13. The layers 14 give the liquid crystal molecules a twist angle $\phi_1$ (for example, 90°) at a voltage of 0 Volt across the electrodes 12, 13.

The device further comprises a compensating layer, in this example a second cell 20 with a second layer of liquid crystal material 21 between two transparent supporting plates 3, 4, which material in this example also has a positive dielectric anisotropy example. The supporting plate 3 is jointly chosen for the two cells 10, 20. Layers 24 for insulation as well as orientation are present on the supporting plates 3, 4. The liquid crystal material 21 and the orienting effect of the layers 24 are chosen to be such that the liquid crystal molecules acquire a twist angle of $\phi_2$ opposed to that of $\phi_1$. The cells 10 and 20 are present between mutually perpendicularly crossed polarizers 5 and 6. The wall orientation of the layers 24 is chosen to be such that the director in the centre of cell 10 is perpendicular to the director in the centre of cell 20.

According to the invention, the thicknesses $d_1$ and $d_2$ and also the values $\Delta n_1$ and $\Delta n_2$ are chosen to be such that the associated values of $d.\Delta n/\lambda_0$ are associated with different Gooch & Tarry extrema. These values of $d.\Delta n/\lambda_0$ are also dependent on the chosen twist angle $\phi$ and have the following values in the range between approximately 65° and approximately 115°:

| $\phi$ (°) | 1° G & T-ext. | 2° G & T-ext. | 3° G & T-ext. | 4° G & T-ext. |
|---|---|---|---|---|
| 65–75 | 0.65–0.75 | 1.60–1.70 | 2.55–2.65 | 3.45–3.65 |
| 75–85 | 0.75–0.85 | 1.70–1.80 | 2.65–2.75 | 3.60–3.80 |
| 85–95 | 0.85–0.95 | 1.90–2.00 | 2.95–3.05 | 3.90–4.10 |
| 95–105 | 0.90–1.00 | 2.10–2.20 | 3.15–3.25 | 4.15–4.35 |
| 105–115 | 1.00–1.10 | 2.15–2.25 | 3.25–3.35 | 4.25–4.45 |

Figure 2A:
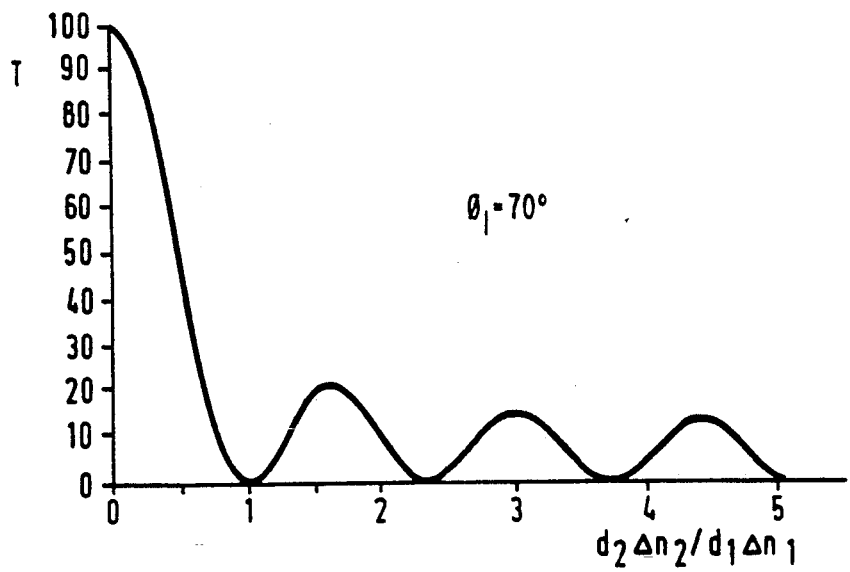
Figure 2B:
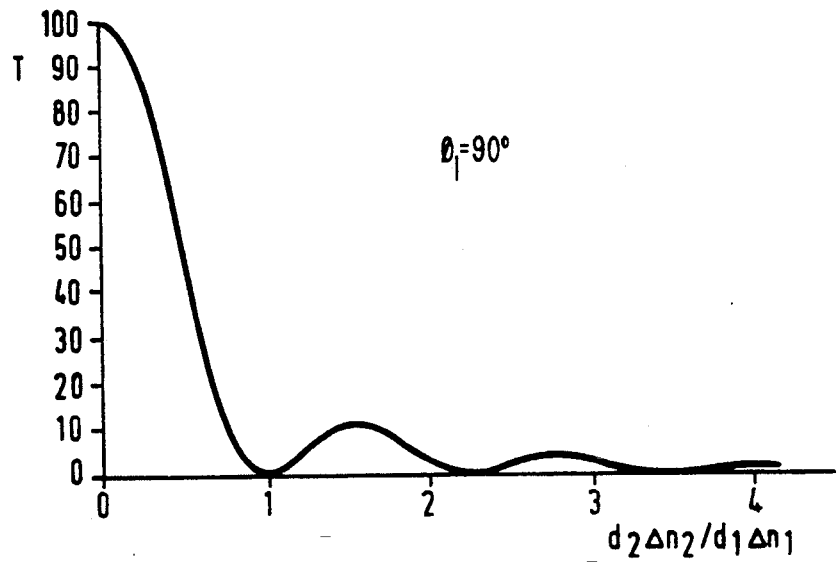
Figure 2C:
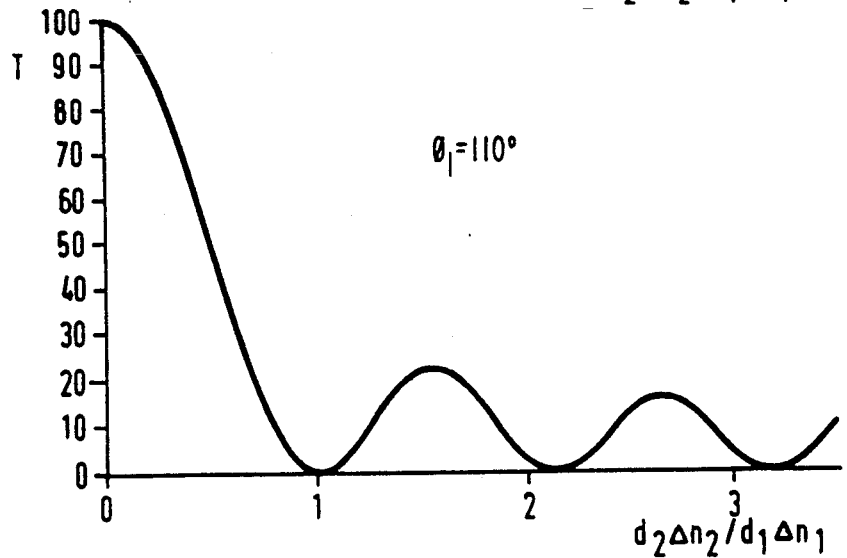

FIGS. 2(a) (b) and (c) show how for different values of $\phi_1$ (70°, 90° and 110°) and $d_1.\Delta n_1/\lambda_0$ (0.70, 0.873 and 1.04 corresponding to the first Gooch & Tarry extremum) the transmission changes as a function of $d_2.\Delta n_2/d_1.\Delta n_1$. Also at the higher Gooch & Tarry extrema of the second cell or a compensating layer, such low transmission values appear to occur that a good contrast can be realised. This is achievable at high values of $d_2$, so that a less accurate process control with regard to the thickness of the second cell is sufficient.

Figure 3:
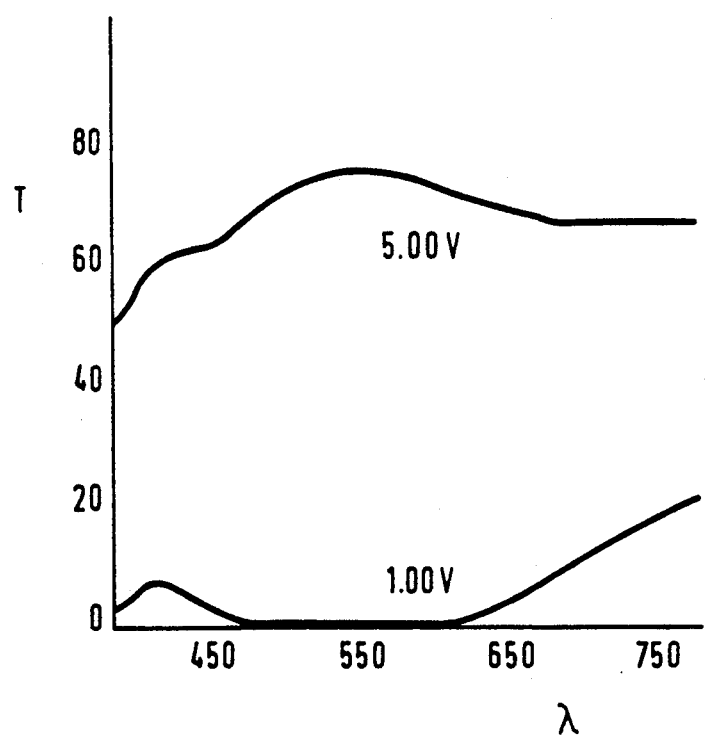
FIG. 3 shows diagrammatically the transmission of a device of the invention as a function of the wavelength $\lambda$ for two different drive voltage values.

The high contrast will be further explained with reference to FIG. 3 in which the wavelength dependence of the transmission is shown for two drive voltages (1.0 and 5.0 Volts) for a double cell of the above-described type with $\phi_1 = -\phi_2$ and $d.\Delta n$ values in the first and the second extremum for the first and the second cell, respectively. It is apparent from the Figure that a high contrast (>100:1) is achieved over a large wavelength range.

The invention is of course not limited to the examples described hereinbefore. Several variations are possible within the scope of the invention. For example, the higher extrema may alternatively be chosen for the first cell, with, for example the d.Δ.n value of the compensator being chosen in the first extremum. It is found that a universal compensator can also be used in this case, with, for example $\phi_2 = 90°$ and $d.\Delta n/\lambda_0 = 0.70$ independent of $\phi_1$.

Instead of a liquid crystal cell, a foil having the required properties may alternatively be used as a compensating layer, which foil is obtained, for example, by giving liquid crystalline polymers the required $\phi$ and $d.\Delta.n$ at temperatures at which these materials are nematic and by subsequently fixing them, for example, by freezing or by means of a UV treatment.

The second layer 21 may alternatively have a negative dielectric anisotropy instead of a positive dielectric anisotropy.

As already noted, $\phi_1$ and $\phi_2$ need not necessarily be equal to each other (in absolute value).

A projection display device may comprise one or more for example, three display devices of this type, in which the d.Δn values for one central wavelength $\lambda_0$ (for example, 550 nm) are then optimized each display device.

We claim:

1. A liquid crystal display device comprising a first liquid crystal cell and a compensating layer between two polarizers, the first cell comprising a twisted neumatic layer of liquid crystalline material having a twist angle $\phi_1$, a thickness $d_1$, an anisotropy $\Delta n_1$, and an optical path length difference $d_1.\Delta n_1$ for incident light having a central wavelength $\lambda_0$, the compensating layer comprising an optically anisotropic material having a twist angle $\phi_2$ in the opposite direction of that of $\phi_1$, a thickness $d_2$, an anisotropy $\Delta n_2$ and an optical path length difference $d_2.\Delta n_2$ for incident light having a central wavelength $\lambda_0$, characterized in that the twist angle $\phi_1$ is between 65° and 115° and the value of $d_1.\Delta n_1/\lambda_0$ for the first liquid crystal cell is determined by a Gooch & Tarry extremum, while the twist angle $\phi_2$ is between −115° and −65° for the compensating layer and the value of $d_2.\Delta n_2/\lambda_0$ is determined by a Gooch & Tarry extremum of a different order than that of the first cell.

2. A liquid crystal display device as claimed in claim 1, characterized in that the first liquid crystal cell or the compensating layer has a twist angle of between 65° and 75° and a $d.\Delta n-/\lambda_0$ value of 0.65–0.75 or of 1.60–1.70 or of 2.55–2.65 or of 3.45–3.65.

3. A liquid crystal display device as claimed in claim 1, characterized in that the first liquid crystal cell or the compensating layer has a twist angle of between 75° and 85° and a $d.\Delta n-/\lambda_0$ value of 0.75–0.85 or of 1.70–1.80 or of 2.65–2.75 or of 3.60–3.80.

4. A liquid crystal display device as claimed in claim 1, characterized in that the first liquid crystal cell or the compensating layer has a twist angle of between 85° and 95° and a $d.\Delta n-/\lambda_0$ value of 0.85–0.95 or of 1.90–2.00 or of 2.95–3.05 or of 3.90–4.10.

5. A liquid crystal display device as claimed in claim 1, characterized in that the first liquid crystal cell or the compensating layer has a twist angle of between 95° and 105° and a $d.\Delta n-/\lambda_0$ value of 0.90–1.00 or of 2.10–2.20 or of 3.15–3.25 or of 4.15–4.35.

6. A liquid crystal display device as claimed in any one of claim 1, characterized in that the first liquid crystal cell or the compensating layer has a twist angle of between 105° and 115° and a $d.\Delta n-/\lambda_0$ value of 1.00–1.10 or of 2.15–2.25 or of 3.25–3.35 or of 4.25–4.45.

7. A liquid crystal display device as claimed in claim 1, characterized in that the polarizers cross each other mutually perpendicularly.

8. A liquid crystal display device as claimed in claim 7, characterized in that the compensating layer has a Gooch & Tarry extremum of a higher order than the first crystal cell.

9. A liquid crystal display device as claimed in claim 7, characterized in that the compensating layer comprises a liquid crystalline material and in that the director halfway across the first liquid crystal cell extends at a substantially right angle to the director halfway the compensating layer in the voltageless state.

10. A liquid crystal display device as claimed in claim 7, characterized in that the first liquid crystal cell or the compensating layer has a twist angle of between 65° and 75° and a d.$\Delta n - /\lambda_0$ value of 0.65–0.75 or of 1.60–1.70 or of 2.55–2.65 or of 3.45–3.65.

11. A liquid crystal display device as claimed in claim 7, characterized in that the first liquid crystal cell or the compensating layer has a twist angle between 75° and 85° and a d.$\Delta n - /\lambda_0$ value of 0.75–0.85 or of 1.70–1.80 or of 2.65–2.75 or of 3.60–3.80.

12. A liquid crystal display device as claimed in claim 7, characterized in that the first liquid crystal cell or the compensating layer has a twist angle between 85° and 95° and a d.$\Delta n - /\lambda_0$ value of 0.85–0.95 or of 1.90–2.00 or of 2.95–3.05 or of 3.90–4.10.

13. A liquid crystal display device as claimed in claim 7, characterized in that the first liquid crystal cell or the compensating layer has a twist angle of between 95° and 105° and a d.$\Delta n - /\lambda_0$ value of 0.90–1.00 or of 2.10–2.20 or of 3.15–3.25 or of 4.15–4.35.

14. A liquid crystal display device as claimed in claim 7, characterized in that the first liquid crystal cell or the compensating layer has a twist angle of between 105° and 115° and a d.$\Delta n - /\lambda_0$ value of 1.00–1.10 or of 2.15–2.25 or of 3.25–3.35 or of 4.25–4.45.

15. A liquid crystal display device as claimed in claim 1, characterized in that the compensating layer has a Gooch & Tarry extremum of a higher order than the first liquid crystal cell.

16. A liquid crystal display device as claimed in claim 15, characterized in that the compensating layer comprises a liquid crystalline material and in that the director halfway the first liquid crystal cell extends at a substantially right angle to the director halfway the compensating layer in the voltageless state.

17. A liquid crystal display device as claimed in claim 15, characterized in that the first liquid crystal cell or the compensating layer has a twist angle of between 65° and 75° and a d.$\Delta n - /\lambda_0$ value of 0.65–0.75 or of 1.60–1.70 or of 2.55–2.65 or of 3.45–3.65.

18. A liquid crystal display device as claimed in claim 15, characterized in that the first liquid crystal cell or the compensating layer has a twist angle between 75° and 85° and a d.$\Delta n - /\lambda_0$ value of 0.75–0.85 or of 1.70–1.80 or of 2.65–2.75 or of 3.60–3.80.

19. A liquid crystal display device as claimed in claim 15, characterized in that the first liquid crystal cell or the compensating layer has a twist angle between 85° and 95° and a d.$\Delta n - /\lambda_0$ value of 0.85–0.95 or of 1.90–2.00 or of 2.95–3.05 or of 3.90–4.10.

20. A liquid crystal display device as claimed in claim 15, characterized in that the first liquid crystal cell or the compensating layer has a twist angle of between 95° and 105° and a d.$\Delta n - /\lambda_0$ value of 0.90–1.00 or of 2.10–2.20 or of 3.15–3.25 or of 4.15–4.35.

21. A liquid crystal display device as claimed in claim 15, characterized in that the first liquid crystal cell or the compensating layer has a twist angle of between 105° and 115° and a d.$\Delta n - /\lambda_0$ value of 1.00–1.10 or of 2.15–2.25 or of 3.25–3.35 or of 4.25–4.45.

22. A liquid crystal display device as claimed in claim 1, characterized in that the compensating layer comprises a second liquid crystal cell having a liquid crystalline material and in that the director halfway across the first liquid crystal cell extends at a substantially right angle to the director halfway across the compensating layer in the voltageless state.

23. A liquid crystal display device as claimed in claim 22, characterized in that the first liquid crystal cell or the compensating layer has a twist angle of between 65° and 75° and a d.$\Delta n - /\lambda_0$ value of 0.65–0.75 or of 1.60–1.70 or of 2.55–2.65 or of 3.45–3.65.

24. A liquid crystal display device as claimed in claim 22, characterized in that the first liquid crystal cell or the compensating layer has a twist angle between 75° and 85° and a d.$\Delta n - /\lambda_0$ value of 0.75–0.85 or of 1.70–1.80 or of 2.65–2.75 or of 3.60–3.80.

25. A liquid crystal display device as claimed in claim 22, characterized in that the first liquid crystal cell or the compensating layer has a twist angle between 85° and 95° and a d.$\Delta n - /\lambda_0$ value of 0.85–0.95 or of 1.90–2.00 or of 2.95–3.05 or of 3.90–4.10.

26. A liquid crystal display device as claimed in claim 22, characterized in that the first liquid crystal cell or the compensating layer has a twist angle of between 95° and 105° and a d.$\Delta n - /\lambda_0$ value of 0.90–1.00 or of 2.10–2.20 or of 3.15–3.25 or of 4.15–4.35.

27. A liquid crystal display device as claimed in claim 22, characterized in that the first liquid crystal cell or the compensating layer has a twist angle of between 105° and 115° and d.$\Delta n - /\lambda_0$ value of 1.00–1.10 or of 2.15–2.25 or of 3.25–3.25 or of 4.25–4.45.

* * * * *